INVENTOR.
JOHN L. WORRALL
BY Joseph J. Gray
ATTORNEY

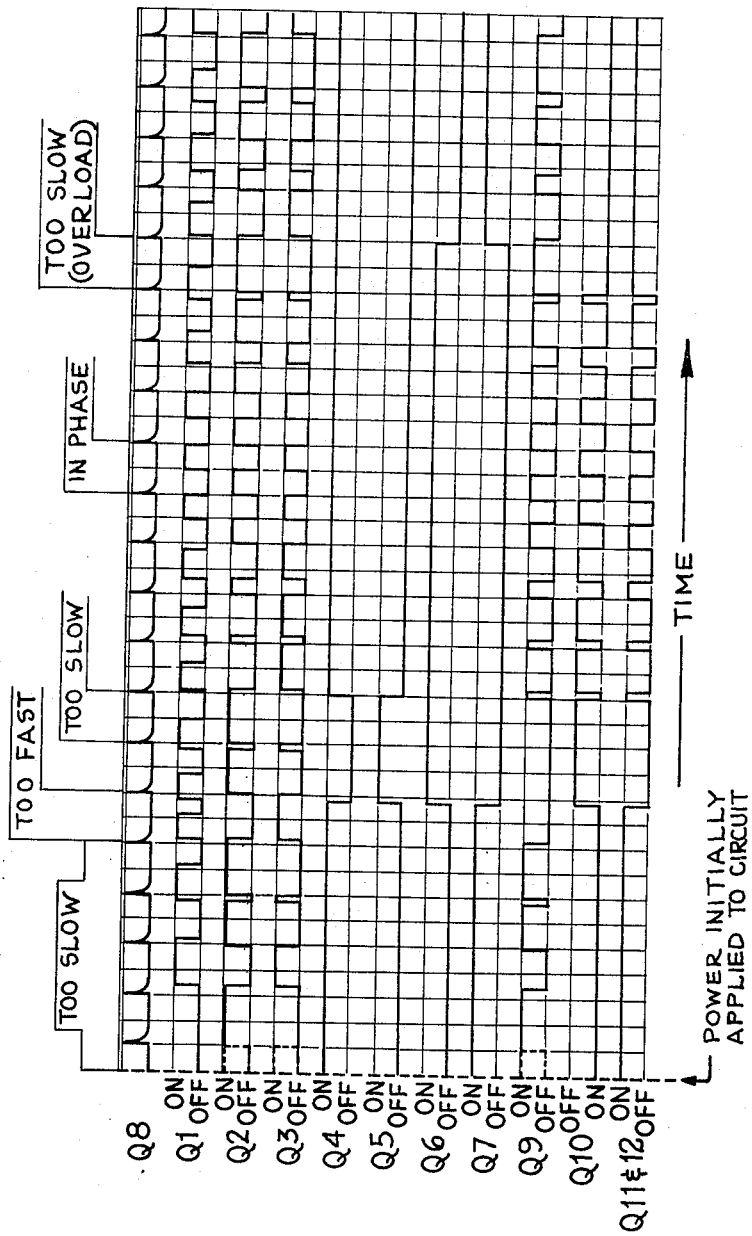

United States Patent Office

3,493,834
Patented Feb. 3, 1970

3,493,834
MOTOR SPEED CONTROL APPARATUS
John L. Worrall, Sunset Park, Ill., assignor to SCM Corporation, New York, N.Y., a corporation of New York
Filed Apr. 24, 1967, Ser. No. 632,998
Int. Cl. H02p 5/00, 7/00
U.S. Cl. 318—314                                                  12 Claims

ABSTRACT OF THE DISCLOSURE

There is disclosed method and apparatus for maintaining the speed of a D.C. electric motor constant. Electrical pulses occurring at equally time spaced intervals are generated and are used as a reference. Electrical pulses proportional in number to the speed of the electric motor are also generated. Electrical energy is applied to the armature winding of the electric motor at the occurrence of each time-spaced pulse, however application of electrical energy to the winding is interrupted during the time between the occurrence of a speed-proportional pulse and the next time-spaced pulse as long as at least one speed-proportional pulse occurs between any two successive time-spaced pulses. Electrical energy is applied to the winding continuously from the time when no speed proportional pulse occurs between two successive time-spaced pulses to the time when two speed-proportional pulses occur between two time-spaced pulses. Specifically, the disclosed apparatus includes three bistable multivibrators, an oscillator electrically connected to all three of the multivibrators, an arrangement electrically connected to two of the mutivibrators for generating the speed-proportional pulses, and circuitry connecting the multivibrators and the armature winding.

---

This invention relates to motor speed control method and apparatus and in particular to method and apparatus for maintaining the speed of a D.C. electric motor constant.

It is a feature of the invention to provide a novel, reliable and accurate method of controlling the speed of an electric motor, and apparatus for carrying out the method.

It is a feature of the invention to provide method of driving an electric motor at constant speed by generating successive equally time-spaced electrical pulses, generating electrical pulses directly proportional in number to the speed of the electric motor, applying electrical energy to the winding at the occurrence of each time-spaced pulse but preventing application of electrical energy to the winding as long as two successive speed-proportional pulses occur between any two successive time-spaced pulses and during the time between the occurrence of any speed-proportional pulse and the next time-spaced pulse as long as at least one speed-proportional pulse occurs between any two successive time-spaced pulses, and applying electrical energy to the winding continuously from the time when no speed-proportional pulse occurs between two successive time-spaced pulses to the time when two speed-proportional pulses occur between two successive time-spaced pulses, and apparatus for carrying out the method.

Other features will become more readily apparent from the following detailed description and the accompanying drawings, in which:

FIGURE 2 is a view showing waveforms depicting the conditions of the various components of the apparatus of FIGURE 1.

Figure 1:
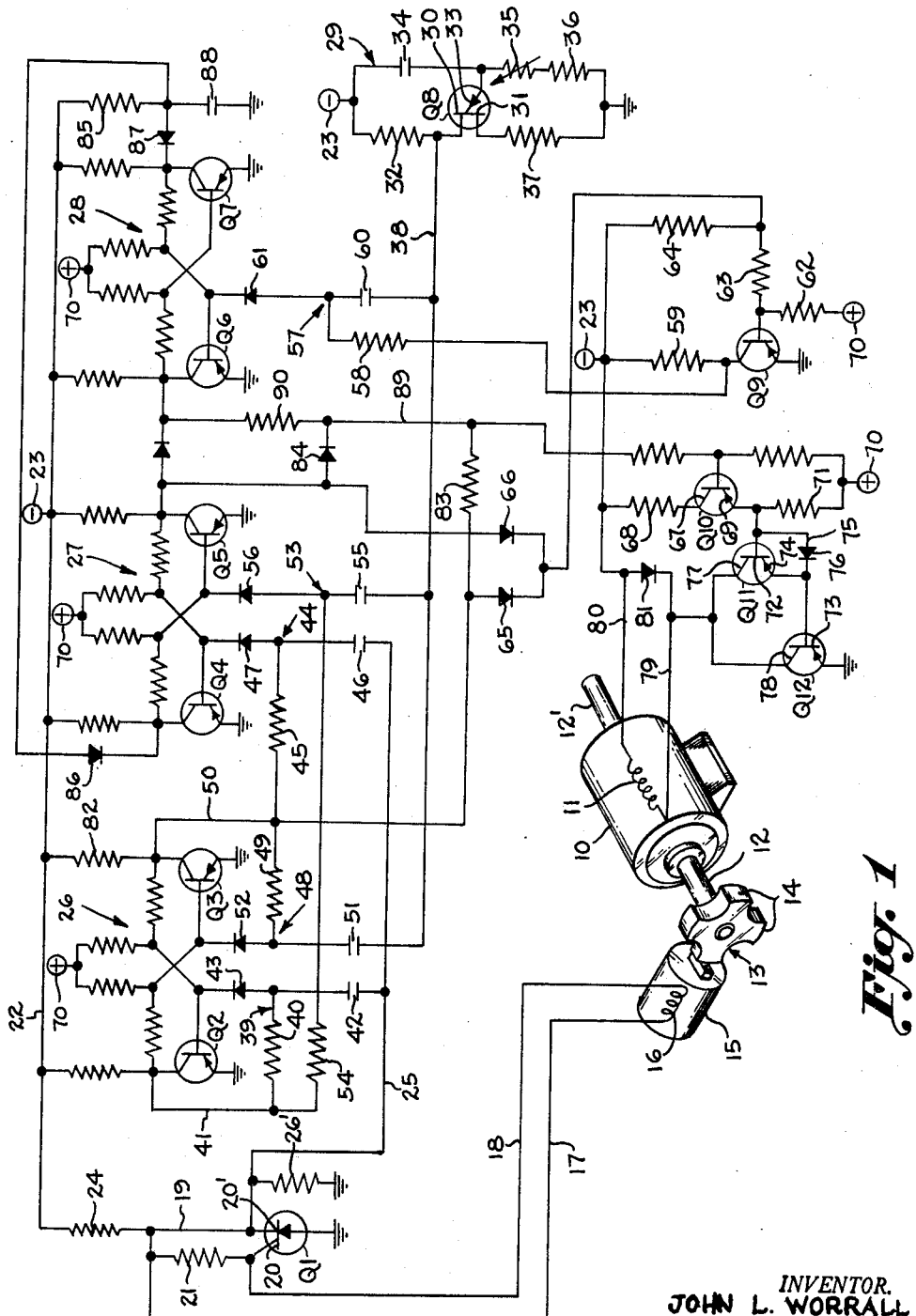
FIGURE 1 is a diagrammatic view of motor speed control apparatus.

Referring to FIGURE 1 of the drawings, there is shown a D.C. electric motor 10 having an armature winding 11 and a permanent magnet field (not shown). The motor 10 has a motor shaft 12 to which a magnet 13 having four poles 14 is secured. Load can be applied to the output portion 12' of the shaft 12. An electromagnetic pickup 15 has a pickup coil 16 responsive to flux changes induced by each of the poles 14 when the magnet 13 rotates. The pickup coil 16 is connected to conductors 17 and 18 which are connected respectively to a conductor 19 and to a gate 20 of a silicon controlled rectifier Q1. The conductor 19 is connected to the cathode 20' of the silicon controlled rectifier Q1. A resistor 21 which connects the conductors 17 and 18 serves to reference the gate 20 to the potential of the cathode 20'. A conductor 22, connected to a source of negative voltage 23, has a resistor 24 with sufficient resistance to cause the silicon controlled rectifier Q1 to turn off when the gate drive is removed. A conductor 25, connected to the conductor 19, is connected to ground through a resistor 26' which causes the pulses from the silicon controlled rectifier Q1 to be reduced in voltage level so that the pedestal gating levels of the multivibrators to which the conductor 25 is connected are not exceeded. When the sine wave voltage induced in the pickup coil 16 is sufficiently high the silicon controlled rectifier Q1 turns "on" and conversely when the sine wave voltage induced in the pickup coil 16 is not sufficiently high the silicon controlled rectifier Q1 turns "off". As best seen in FIGURE 2, the silicon controlled rectifier Q1 imposes a square tooth signal on the conductor 25 with the individual Q1 pulses of the signal being directly proportional in number to the speed of the electric motor 10.

There are shown in FIGURE 1, three bistable multivibrators 26, 27, and 28. The multivibrator 26 has a pair of transistors Q2 and Q3, the multivibrator 27 has a pair of transistors Q4 and Q5, and the multivibrator 28 has a pair of transistors Q6 and Q7.

An astable unijunction transistor multivibrator or oscillator generally indicated at 29 has a unijunction transistor Q8. Base-one 30 of the unijunction transistor Q8 is connected to the negative voltage source 23 through a resistor 32. The emitter 33 of the unijunction transistor Q8 is connected to the negative voltage source 23 through a capacitor 34, and to ground through a variable resistor 35 and a fixed resistor 36. Base-two 31 is connected to ground through a resistor 37. The frequency of the output pulses identified as Q8 in FIGURE 2 is mainly determined by the values of the resistors 35 and 36, the capacitor 34, and the negative voltage source 23; the Q8 pulses imposed on a conductor 38 are represented by sharp spikes which occur at constant time-spaced intervals. The Q8 pulses thus serve as reference pulses.

A pedestal gate 39 includes a resistor 40 connected to a conductor 41, a capacitor 42 connected to the conductor 25 and a diode 43 connected to the base of the transistor Q2. A pedestal gate 44 includes a resistor 45 connected to the conductor 50, a capacitor 46 connected to the conductor 25, and a diode connected to the base of the transistor Q4.

A pedestal gate 48 includes a resistor 49 connected to a conductor 50, a capacitor 51 connected to the conductor 38 and a diode 52 connected to the base of transistor Q3. A pedestal gate 53 includes a resistor 54 connected to the conductor 41, a capacitor 55 connected to the conductor 38 and a diode 56 connected to the base of the transistor Q5. A pedestal gate 57 includes a resistor 58 connected to a resistor 59 and to a transistor Q9, a capacitor 60 connected to the conductor 38 and a diode 61 connected to the base of the transistor Q6.

The transistor Q9, the resistor 59 and resistors 62 and 63 are arranged and connected to invert the output of an "AND" gate formed by diodes 65 and 66 and the resistor 64.

A transistor Q10 is arranged to serve as an emitter follower; the collector 67 of the transistor Q10 is connected to the negative voltage source 23 through a resistor 68 which limits the base current to a transistor Q11. An emitter 69 of the transistor Q10 is connected to positive voltage source 70 through a resistor 71 and to base 72 of the transistor Q11. The transistor Q11 and a transistor Q12 are connected in a Darlington configuration and serve as power amplifiers for the winding 11. Base 73 of the transistor Q12 is connected to an emitter 74 of the transistor Q11. A conductor 75 containing a diode 76 is connected to the base 72 and to the emitter 74. The base 73 of the transistor Q12 is connected to the emitter 74 of the transistor Q11. Collectors 77 and 78 of respective transistors Q11 and Q12 are connected to each other and to a conductor 79. The conductor 79 is connected to one side of the armature winding 11, and a conductor 80 is connected to the other side of the winding 11. The conductor 80 is connected to the negative voltage source 23. A diode 81 suppresses the induction kick of the armature winding 11 when transistors Q11 and Q12 turn "off."

Throughout the specification when a transistor is stated to be "on" it is in a conducting condition and when a transistor is stated to be "off" it is in a non-conducting condition. With reference to FIGURES 1 and 2, every Q8 spike or pulse will turn the transistor Q3 "off" through the pedestal gate 48, thereby causing the transistor Q2 to turn "on." If the transistor Q3 is intially "off" it will remain "off" and the transistor Q2 will remain "on." Regardless of the width of a Q1 pulse it is considered to occur at its initiation. Every Q1 pulse will turn the transistor Q2 "off" through the pedestal gate 39, thereby causing the transistor Q3 to turn "on." Considering only the action of the multivibrator 26, when a Q8 pulse turns the transistor Q3 "off" a circuit is established from the negative voltage source 23 through a resistor 82, through the conductor 50 and its resistor 83, thereby turning the transistors Q10, Q11 and Q12 "on" and causing the armature winding 11 to be energized; when a Q1 pulse turns the transistor Q2 "off," the transistor Q3 turns "on," thereby disabling this circuit to the winding 11 and causing the armature coil 11 to be de-energized. Still considering only the action of the multivibrator 26, it is apparent that during the time interval from the occurrence of a Q8 pulse and the occurrence of the next Q1 pulse, the winding 11 will be energized, and that during the time interval between the occurrence of a Q1 pulse and the next Q8 pulse, the winding 11 will be de-energized; thus, if the motor 10 is running at the correct speed, the interval of time between a Q8 pulse and the next Q1 pulse will be adequate to supply the coil 11 with sufficient electrical energy. Should the motor load increase, the motor speed will decrease, but in so doing the interval of time between a Q8 pulse and the next Q1 pulse will increase, thereby energizing the winding 11 for a longer period of time. Conversely, should the load decrease, the motor speed will increase slightly, but in so doing the interval of time between a Q8 pulse and the next Q1 pulse will decrease, thereby energizing the winding 11 for a shorter period of time.

The multivibrator 27 is effective during the time that the motor 10 is in the overspeed conditions as evidenced by two Q1 pulses occurring between two successive Q8 pulses. Assuming such an overspeed condition, a Q8 pulse will turn the transistor Q3 "off," causing the transistor Q2 to turn "on." The next Q1 pulse will turn the transistor Q2 "off," causing the transistor Q3 to turn "on." With the transistor Q3 "on," the pedestal gate 44 is enabled. The second successive Q1 pulse, before the second successive Q8 pulse, will trigger the pedestal gate 44 and turn the transistor Q4 "off," causing the transistor Q5 to turn "on." When the transistor Q5 turns "on," the transistor Q6 is also turned "on" and the transistor Q7 is turned "off." No electrical energy will be thereafter applied to the armature winding 11 until there is no Q1 pulse between two Q8 pulses, at which time the motor 10 is in the underspeed condition.

The motor speed will be too slow when current is initially applied to the circuit at start up, when phasing out of an overspeed condition, and when the motor is in the overloaded condition. In the start-up condition, when positive voltage is applied at 70, negative voltage is applied at 23, and when the ground connection indicated by the ground symbol is established, the transistor Q4 and the transistor Q7 are turned "on" by a circuit through a resistor 85 and respective diodes 86 and 87. When a capacitor 88 is fully charged, the multivibrators 27 and 28 are fully operational. Following application of initial current to the circuit, the transistors Q5 and Q6 remain "off" until two Q1 pulses occur between two Q8 pulses, but until this occurs the armature winding 11 is continuously supplied with electrical energy because of a circuit to the transistors Q10, Q11, and Q12 through a conductor 89 containing a resistor 90. Even though Q1 pulses occur the pedestal gate 44 is not triggered until such time as two Q1 pulses occur between two Q8 pulses, at which time the pedestal gate 44 can turn the transistor Q4 "off." Such application of continuous power to the armature coil, as indicated in FIGURE 2, will speed up the motor 10.

When the motor 10 is phasing out of its overspeed condition no electrical energy will be applied to the armature winding 11 until no Q1 pulse occurs between two Q8 pulses because the transistor Q5 is "on" disabling the paths through the conductor 50 and also through the conductor 89.

At this time the motor is in the underspeed condition. A Q8 pulse will now turn the transistor Q3 "off," causing the transistor Q2 to turn "on," thereby enabling the pedestal 53. The next Q8 pulse will turn the transistor Q5 "off," causing the transistor Q4 to turn "on." With the transistor Q5 "off" the diode 84 clamp on the input of the transistor Q10 is removed and the transistor Q3 will constitute the electrical input to the transistor Q10.

When the motor speed is nearly correct, the multivibrator 26 functions normally as previously described.

Should the motor load become too great, no Q1 pulse occurs between two Q8 pulses. The underspeed condition will exist and the multivibrator 28 will be effective to cause continuous power to be applied to the winding 11, because Q3 will be turned "off" in response to the first Q8 pulse and will remain "off" at the occurrence of the next successive Q8 pulse. The transistor Q5 from the previous operation will be "off" with both the transistors Q3 and Q5 being "off" the pedestal 57 will be enabled, turning the transistor Q6 "off," and upon the occurrence of the next Q8 pulse, causing continuous power to be applied to the winding 11 through the conductor 89.

The numbers of Q1 and Q8 pulses which can be illustrated in FIGURE 2 are necessarily limited. FIGURE 2 is not to be considered as representative of the actual numbers of pulses between the various conditions of "energy initially applied," "too fast," and "too slow." Nevertheless the various conditions of operation are illustrated. The frequency of occurrence of Q8 pulses is large, by way of example, not limitation, the frequency of the Q8 pulses is approximately 102 cycles per second but a higher or lower frequency can be used if desired.

The repetition rate or frequency of the Q8 pulses will be selected in accordance with the desired motor speed and the number of Q1 pulses occurring per revolution of the motor shaft 12. By way of example, not limitation, when all four of the poles 14 are either north or south poles, and the desired motor speed is to be about 1530 r.p.m., the equally time-spaced Q8 pulses occur approximately every 9.8 milliseconds.

By way of example, not limitation, the negative voltage source 23 can be −12 volts, the positive voltage source can be +2.8 volts, and ground is zero volts.

I claim:
1. Apparatus for maintaining the speed of an electric motor substantially constant, said electric motor having an armature winding, comprising: a first bistable multivibrator, a second bistable multivibrator, an oscillator electrically connected to said first and second multivibrators for producing equally time-spaced electrical pulses, means electrically connected to said first and second multivibrators for generating electrical pulses proportional in number to speed of said electric motor, said first and second multivibrators being electrically connected to said winding, means responsive to a time-spaced pulse for actuating said first multivibrator to energize said winding, means responsive to a speed-proportional pulse for actuating said first multivibrator to deenergize said winding, means responsive to the occurrence of a second of two successive speed-proportional pulses during the time between two successive time-spaced pulses for actuating said second multivibrator to prevent energization of said winding by said first multivibrator, a third bistable multivibrator electrically connected to said winding and operable to energize said winding, and means effective as long as no speed-proportional pulse occurs during the time between two successive time-spaced pulses for actuating said third multivibrator to energize said motor.

2. An apparatus for maintaining the speed of an electric motor substantially constant, the electric motor having a winding, comprising: first and second bistable multivibrators having outputs; means for generating reference pulses; setting means actuated by a reference pulse for setting the first multivibrator, and for setting the second multivibrator when the first multivibrator is already set; means for generating motor pulses whose number is proportional to the speed of the motor; resetting means actuated by a motor pulse for resetting the first multivibrator, and for resetting the second multivibrator when the first multivibrator is already reset; and control means for effecting energization of the winding when one of the multivibrators is set, said control means including gating circuit means connecting both (a) an output of said first multivibrator and (b) an output of said second multivibrator to the winding.

3. An apparatus in accordance with claim 2 wherein the setting means comprises: first and second signal paths, each having an input to which said reference pulses are applied, and each having an output connecting to and arranged to set the correspondingly numbered multivibrator; said second signal path passing through a gate having an enable input that connects to the output of the first multivibrator.

4. An apparatus in accordance with claim 2 wherein the resetting means comprises: first and second signal paths, each having an input to which said reference pulses are applied, and each having an output connecting to and arranged to reset the correspondingly numbered multivibrator; said second signal path passing through a gate having an enable input that connects to the output of the first multivibrator.

5. An apparatus in accordance with claim 2 wherein the control means connecting the multivibrator outputs to the motor winding energizes the motor only when both of the multivibrators are set.

6. An apparatus for maintaining the speed of an electric motor substantially constant, comprising: first, second, and third bistable multivibrators having outputs; means for generating reference pulses; setting means actuated by the reference pulses for setting the first multivibrator, for setting the second multivibrator when the first multivibrator is already set and for setting the third multivibrator when both the first and second multivibrators are already set; means for generating motor pulses whose number is proportional to the speed of the motor; resetting means actuated by the motor pulses for resetting the first multivibrator, and for resetting the second and third multivibrators when the first is already reset; and motor energization means connecting the multivibrator outputs to the motor for energizing the motor whenever either the first or the third multivibrator is set and the second multivibrator is also set.

7. An apparatus in accordance with claim 6 wherein the setting means comprises: first, second, and third signal paths, each having an input to which said reference pulses are applied, and each having an output connecting to and arranged to set the correspondingly numbered multivibrator; said second signal path passing through a first gate having an enable input that connects to the output of the first multivibrator; and said third signal path passing through a second gate within a circuit having two enable inputs that connect to the outputs of both the first and the second multivibrators.

8. An apparatus in accordance with claim 7 wherein the circuit comprises the second gate and an AND gate, wherein the two enable inputs to the circuit are the inputs to the AND gate, and wherein the second gate includes an enable input that connects to the output of the AND gate.

9. An apparatus in accordance with claim 6 wherein the resetting means comprises first, second, and third signal paths, each having an input to which said motor pulses are applied, and each having an output connecting to and arranged to reset the correspondingly numbered multivibrator; said second and third signal paths passing through a gate having an enable input that connects to the output of the first multivibrator.

10. An apparatus in accordance with claim 9 wherein the third signal path includes the second signal path, the second multivibrator, and a circuit connecting the output of the second multivibrator to the third multivibrator.

11. An apparatus in accordance with claim 10 wherein the circuit comprises a diode which connects the output of the second multivibrator to the output of the third multivibrator.

12. An apparatus in accordance with claim 6 wherein the motor energization means comprises:
an amplifier having an input, and having an output connected to the motor;
first and second resistive circuits respectively connecting the outputs of the first and third multivibrators to the amplifier input, and arranged to cause energization of the motor when either the first or the second multivibrator is set; and
a diode connecting the output of the second multivibrator to the amplifier input, and arranged to override the effects of said resistors and to deenergize the motor when the second multivibrator is reset.

References Cited

UNITED STATES PATENTS

| | | | |
|---|---|---|---|
| 3,176,208 | 3/1965 | Gifft | 318—314 |
| 3,331,006 | 7/1967 | Strand et al. | 318—341 X |

ORIS L. RADER, Primary Examiner

R. J. HICKEY, Assistant Examiner